(12) United States Patent
Thiele et al.

(10) Patent No.: US 7,020,361 B2
(45) Date of Patent: Mar. 28, 2006

(54) OPTICAL DATA TRANSFER SYSTEM WITH SCATTERING CENTERS

(75) Inventors: Hans Thiele, Schweinfurt (DE); Harry Schilling, Georgensgmuend (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 0 days.

(21) Appl. No.: 10/297,770

(22) PCT Filed: Jun. 8, 2001

(86) PCT No.: PCT/DE01/02120

§ 371 (c)(1),
(2), (4) Date: Aug. 27, 2003

(87) PCT Pub. No.: WO01/95000

PCT Pub. Date: Dec. 13, 2001

(65) Prior Publication Data
US 2004/0037498 A1    Feb. 26, 2004

(30) Foreign Application Priority Data

| Jun. 8, 2000 | (DE) | ................. 100 27 786 |
| Feb. 2, 2001 | (DE) | ................. 101 06 297 |

(51) Int. Cl.
  *G02B 6/20* (2006.01)
  *G02B 6/42* (2006.01)
  *G02B 6/26* (2006.01)

(52) U.S. Cl. .................... 385/31; 385/88; 385/125; 385/4

(58) Field of Classification Search ................ 385/4, 385/37, 40–42, 122, 123, 125, 129, 141–142
See application file for complete search history.

(56) References Cited

U.S. PATENT DOCUMENTS

| 4,640,592 | A | * | 2/1987 | Nishimura et al. | .......... 385/125 |
| 4,733,929 | A | * | 3/1988 | Brown | ................ 385/31 |
| 5,257,329 | A | * | 10/1993 | Blyler et al. | .......... 385/11 |
| 5,351,319 | A | * | 9/1994 | Ginder et al. | ........... 385/6 |
| 5,724,460 | A | * | 3/1998 | Hayden et al. | ........... 385/4 |
| 5,881,200 | A | | 3/1999 | Burt | |
| 5,974,212 | A | * | 10/1999 | Saeki | ............... 385/37 |
| 6,438,298 | B1 | * | 8/2002 | Matsui et al. | .......... 385/50 |
| 6,529,676 | B1 | * | 3/2003 | Eggleton et al. | ........ 385/142 |
| 6,859,569 | B1 | * | 2/2005 | Ishibashi et al. | .......... 385/12 |

FOREIGN PATENT DOCUMENTS

| WO | 98/44367 | 10/1998 |
| WO | 99/57584 | 11/1999 |
| WO | 00/36979 | 6/2000 |

* cited by examiner

*Primary Examiner*—Rodney Bovernick
*Assistant Examiner*—Omar Rojas
(74) *Attorney, Agent, or Firm*—Crowell & Moring LLP

(57) ABSTRACT

A data transfer system for the optical transmission of data using an optical waveguide. The emitter and/or the receiver is adapted to be displaced along the optical waveguide or positioned at different sites. The optical data transfer system allows light to be coupled or decoupled by scattering centers at optional positions.

8 Claims, 4 Drawing Sheets

Fig. 4:
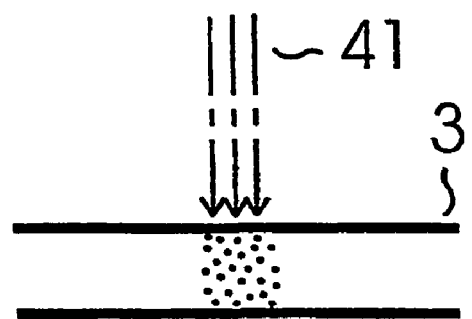
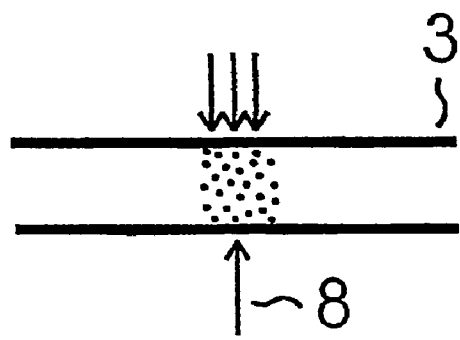
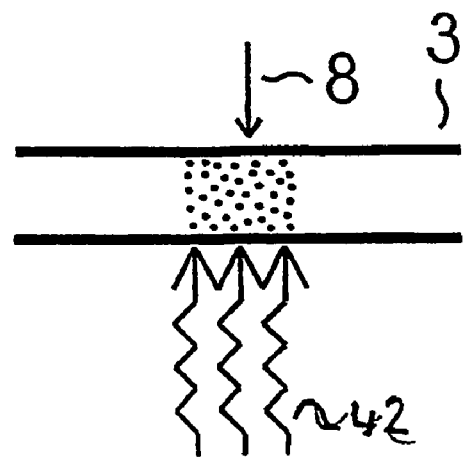

OPTICAL DATA TRANSFER SYSTEM WITH SCATTERING CENTERS

BACKGROUND AND SUMMARY OF THE INVENTION

The present invention relates to a data transfer system for the optical transmission of data using optical waveguides, wherein the transmitter and/or receiver must be displaced along an optical waveguide or must be positioned in different positions. Such data transfer systems are employed, for example, in a linear configuration in crane installations or other conveying systems for the transmission of data between the mobile crane and a stationary control unit. Another field of application of these data transfer systems in a circular configuration is the transmission between parts rotatable relative to each other, such as in a computer tomograph between the rotor that supports the X-ray tube and the detector, and a stationary analyzing unit that processes and displays the video data.

In common transfer systems operating on the basis of optical waveguides, light is coupled into one end of the optical waveguide and is then passed through the optical waveguide up to the latter's other end where it is analyzed again by an appropriate receiver. Based on this system, a great number of different variants have become known, which permits the simultaneous transmission of several wavelengths by means of filters or even the transfer to several different sites, for example by way of Y-couplers. Such systems are, however, not suitable for coupling or decoupling signals into or out of a light-guide fiber at any position whatsoever. To this end, various other technologies are known.

U.S. Pat. No. 4,962,986 discloses a system in which a coupling medium, whose refractive index is higher than the index in the environment, is contacted directly with the fiber core for coupling and decoupling light into and out of light-guiding fibers. As a result, the light conveyed in the fiber is deflected into the coupling medium. This arrangement presents the decisive disadvantage that the coupling medium must be in direct connection with the fiber core. Hence, this system is suitable for application almost exclusively for coupling at predetermined invariable positions. Such a system, however, is hardly applicable for arrangements in which the transmitter and the receiver are mobile relative to each other because here, the coupling medium must slide at a high speed along the fiber core, which is mostly very thin and highly sensitive.

A more expedient device is described in U.S. Pat. No. 5,297,225. There, light, which is coupled in from the outside through notches formed on the outside in the light-conducting medium, is deflected by reflection at such angles that it can be guided in the medium. Such a transmission device is suitable for sensible application when coupling is to take place at invariably predetermined locations. In principle, it is also applicable for the transmission between mobile units because the light is coupled in or coupled out without contact. When, as a matter of fact, a fairly long path of movement is required, which is the case in crane installations or also rotary transformer systems, the great number of notches along the light-guiding medium results in an unacceptable strong attenuation.

In an approach to eliminate the disadvantage of strong attenuation, the fluorescence system has been developed, which is described in the PCT document WO 95/35605. Here, the light-guiding fiber is doped with a fluorescent dye. Light incident from the outside is absorbed by the molecules of the fluorescent dye, which are then stimulated to emit light. The emission of light takes place in all directions, in a manner similar to a spherical light source. Hence, light is generated inside the light-guiding fiber, of which a slight fraction is also within the acceptance angle of this fiber and can hence by passed on the fiber. The advantage of this method resides in the conversion of the wavelength by the molecules of the fluorescent dye. The energy level in the light emitted by the molecules of the fluorescent dye is thus fundamentally lower than the energy level of the light absorbed by the molecules. The emitted light hence presents a longer wavelength. The energy of the light emitted by a molecule of the fluorescent dye is not sufficient for being absorbed in further molecules of the same kind in the fluorescent dye and for causing, in its turn, the emission of fluorescent light again. The light-guiding fiber doped with molecules of the florescent dye hence displays a weaker attenuation for the light generated by the fluorescence effect. As a result, transfer systems of a great length or of a wide diameter can therefore be implemented in an efficient manner. This system now presents the substantial disadvantage that the fluorescence effect is not stopped spontaneously when the energy supply by the stimulating light is stopped but rather undergoes an exponential decay. This leads to a limitation of the transferred signals in terms of speed or bandwidth, respectively. The best fibers with fluorescent dyes, which have been tested in laboratory tests, display time constants in the order of some nano seconds and are hence suitable for application only up to several 100 Mbaud but by no means for the Gbaud range.

This limitation of the bandwidth is avoided by the transfer system represented in the PCT document WO 98/00936. In a manner similar to the aforedescribed system, here light is coupled from the outside into a light-guiding fiber that has been doped with dyes. Here, however, it is the stimulated emission of a material whose electron array can be inverted by energetic stimulation, rather than the fluorescence effect, which is utilized. The disadvantage of this arrangement is the high expenditure in engineering terms, for example in wavelength multiplexers and pumping light sources. As a result, such arrangements are not yet suitable for the widerange series application on an industrial scale.

Another method is based on the coupling of light via an optical grating that is applied, for example, by photorefractive materials inside a glass fiber (as is published in U.S. Pat. No. 4,749,248) or in the form of an envelope on a glass fiber (as is published in the PCT document WO 99/04309).

In the statements presented in the following, reference is made to the term "optical waveguide". This term relates to the preferred embodiment because light must be guided in an attenuation-free manner only on one light guide particularly in the case of fairly long distances. The subject matter of the invention is, of course, applicable also to all other kinds of light guides with the same effects.

DETAILED DESCRIPTION OF THE DRAWINGS

The present invention is based on solving the problem of providing an optical data transfer system that no longer presents the aforementioned disadvantages and that is suitable, in particular, for a non-contacting transfer of high data rates along a path of major length, at comparatively low costs of production.

One solution to this problem is provided by an optical waveguide has optical scattering centers for coupling or decoupling, respectively, at the at least one site for coupling or decoupling from the outside.

The invention includes an optical waveguide, preferably a glass fiber, which contains scattering centers in its interior near those positions where light is to be coupled in or out, respectively. These scattering centers have the function of deflecting light into different directions. In the case of lateral coupling along the optical waveguide, hence light is deflected, at least partially, by the scattering centers in a solid angle at which the light can be passed on in optical waveguides. In the case of lateral decoupling, the light guided in the optical waveguide is deflected, at least partially, into directions outside the optical waveguide.

For the sake of simplicity, the term "scattering centers" is used in the plural form in this document because this corresponds to the preferred field of application. It is, of course, also possible to realize the invention with a single scattering center only with the same effects. As the scattering centers are, as a rule, very small, as a matter of fact, mostly a plurality of such scattering centers in close vicinity to each other will be used, as a rule.

The effect of the scattering centers—the scattering—is an optical effect that involves a great number of particles, preferably microscopic particles, which are mostly not oriented on purpose. It is based on different optical characteristics of these particles relative to the medium surrounding them. For example, the refractive index or the transmissivity of the scattering particles may present different values. By contrast, the reflection is a preferably macroscopic effect, for instance, which induces a deflection of the light mostly in a preferred direction.

In a particularly expedient embodiment of the invention, scattering centers are permanently present in the optical waveguide. Such an embodiment of the invention is expedient particularly when light is to be coupled or decoupled at certain invariably predetermined positions. This is the case, for instance, in bus systems. Due to the configuration with a few scattering centers only, which are exclusively associated with the positions for signal coupling or decoupling, respectively, a substantially reduced via net attenuation is achieved, compared against optical waveguides that present a configuration that scatters over a majority or substantial part of their length.

In another expedient embodiment of the invention, the nature of the optical waveguide is so designed that the site or the nature of the scattering centers, respectively, can be controlled by outside stimulation. Hence, scattering centers can be created at defined varying positions. For example, the site of one scattering center can be dynamically varied as a movement of an element for light coupling or decoupling, respectively, varies. Hence, the scattering center can follow the rotational movement and permit a continuous light coupling or decoupling, respectively, during the rotation in the case of a rotating movement. Optionally, it is possible to take an influence not only on the site of the scattering center but also on the nature of the scattering center. The nature of the scattering center takes an essential influence on the amount of scattering. In principle, parameters such as the size or even the density of the scattering centers can be influenced. For example, in the case of short distances between the coupling and decoupling element, it is possible to adjust the scattering center to a low scattering level on a transmission path because in such a case the loss along the path is low and as hence only a small signal fraction must be coupled or decoupled, respectively. In the case of fairly long distances, by contrast, it makes sense to adjust the center to a higher scattering level in order to achieve a stronger coupling or decoupling action, respectively. It is hence possible, for instance, to control the nature of the scattering centers for a compensation of the distance-dependent attenuation or loss along the transmission path so that receivers presenting a lower dynamic level may be used.

It is equally possible to compensate other effects such as different transmitter outputs, receiver sensitivities or even defects or disorders along the transmission path by an adaptation of the scattering centers. The control of the nature of the scattering centers encompasses, of course, also a simple creation or removal of the scattering centers.

In another expedient embodiment of the invention, the optical waveguide contains material whose scattering can be influenced preferably by electromagnetic fields or waves or also by particles. In order to take the least influence possible on the transmission of the light, this material preferably displays a low attenuation in the non-scattering condition. On account of the possibility to take an influence by electromagnetic fields or waves, respectively, a particularly controllability of the scattering effect from the outside is possible. In this case, in particular, a non-contacting control is possible without any problems. A special case of electromagnetic waves is light. Specifically with light having a higher power density, scattering centers may be created in certain materials. For example, in such a case the optical waveguide must be irradiated with a light source displaying a high power density for the creation of scattering centers. Then an influence may be taken on the scattering effect produced by the scattering centers by varying the power density.

In a further expedient embodiment of the invention, the optical waveguide contains material in which the scattering centers are effective due to defined physical properties. These are particularly variations of the volume, the structure, the effects of inter-molecular or intra-molecular forces or even variations of at least one state of matter. Particularly with a variation of these parameters in small particles enclosed in the optical waveguide it is possible to vary their refractive index or their attenuation, which may result in scattering.

In a further expedient embodiment of the invention, the optical waveguide contains material presenting special properties so that the scattering of this material can be influenced, preferably by at least one of the following effects:
  photo-refractive effect
  photo-addressable effect
  effect of thermal non-linearity
  rheologic effect.

When the optical waveguide into which such a material has been admixed is stimulated at one site, locally reversible scattering centers are formed there. This means that the scattering centers are reconverted when the stimulation is no longer applied. It is, of course, also possible to use materials in which scattering centers are present without stimulation and which are reconverted only in response to stimulation. On account of the preferred local formation of the scattering centers in the region of stimulation, the attenuation remains low in the remaining parts of the optical waveguide.

One expedient embodiment of the invention consists in the aspect that the optical waveguide is made of a material suitable for light-guiding applications, such as glass or a synthetic resign, while it is realized in the form of a fiber or a planar waveguide element. With the realization in the form of a waveguide, it is possible to keep the dispersion of the signal small. Hence, a wide-band signal transfer is possible even over long distances. Apart therefrom, with the configuration of the optical waveguide proposed here, it is possible keep the attenuation at a low level so that even in case of long transfer distances only a weak dynamic response of the receiver is required.

In a further expedient embodiment of the invention, the optical waveguide is configured in the form of a hollow body that is optionally filled with solids, liquids or gases. In this manner, a particularly simple manufacutre of the inventive device becomes possible. For example, a simple flexible tubing of synthetic resin can be drawn as envelope that is then filled with an appropriate liquid displaying the desired properties.

In still another advantageous embodiment of the invention, separate signal or energy sources, respectively, are used to control the scattering action or for signal transfer, respectively. For instance, a first source of energy is provided that stimulates the scattering centers at the desired coupling site by supply of energy in such a manner that these centers present the desired scattering. A second source of energy, for instance a modulated laser, serves to transfer information by coupling its light by way of the scattering centers into the optical waveguide.

Another embodiment of the invention consists presents a single source of energy at a signal coupling or decoupling site for controlling the scattering centers and for the transfer of information. For example, a particularly efficient laser may be used for energy coupling, which couples the required energy into the optical waveguide for control of the scattering effect and transfers, at the same time, the information.

BRIEF DESCRIPTION OF THE DRAWINGS

In the following, the invention will be described, in an exemplary manner without any restriction of the general inventive idea, by the example of embodiments, with reference to the drawings.

In the drawings:

FIG. 4 illustrates different modes of stimulation or signal coupling, respectively.

DETAILED DESCRIPTION OF THE DRAWINGS

Figure 1:
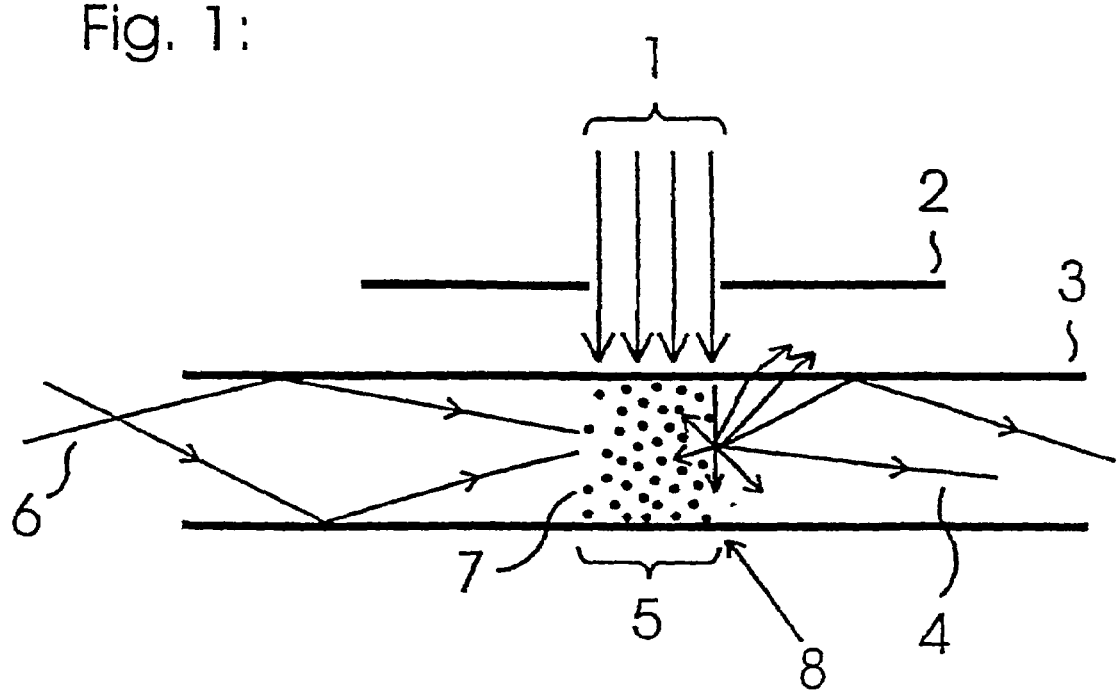
FIG. 1 illustrates a general embodiment of the invention.

In FIG. 1, an optical waveguide (3) guides light (6) that can propagate in the waveguide only at a low loss or attenuation. This optical waveguide contains scattering centers (7) in a locally limited region (5). On the one hand, the light (6) propagating in the optical waveguide is scattered on these scattering centers so that the scattered light will propagate in all directions. Hence, one fraction of the scattered light also exits from the optical waveguide. The light (8) from an external light source can equally irradiate the optical waveguide. When this light is incident on the scattering centers it is equally scattered in all directions. One fraction of the light (4) is scattered in the longitudinal direction of the optical waveguide and can hence be guided in the latter. In the case of an embodiment with controllable scattering centers, additional energy (1) is supplied via an optional diaphragm (2) for controlling the scattering centers. The diaphragm has here the function of a precise definition of the limitation of the irradiation of the optical waveguide so that the scattering centers will be crated only in a precisely defined region.

Figure 2:
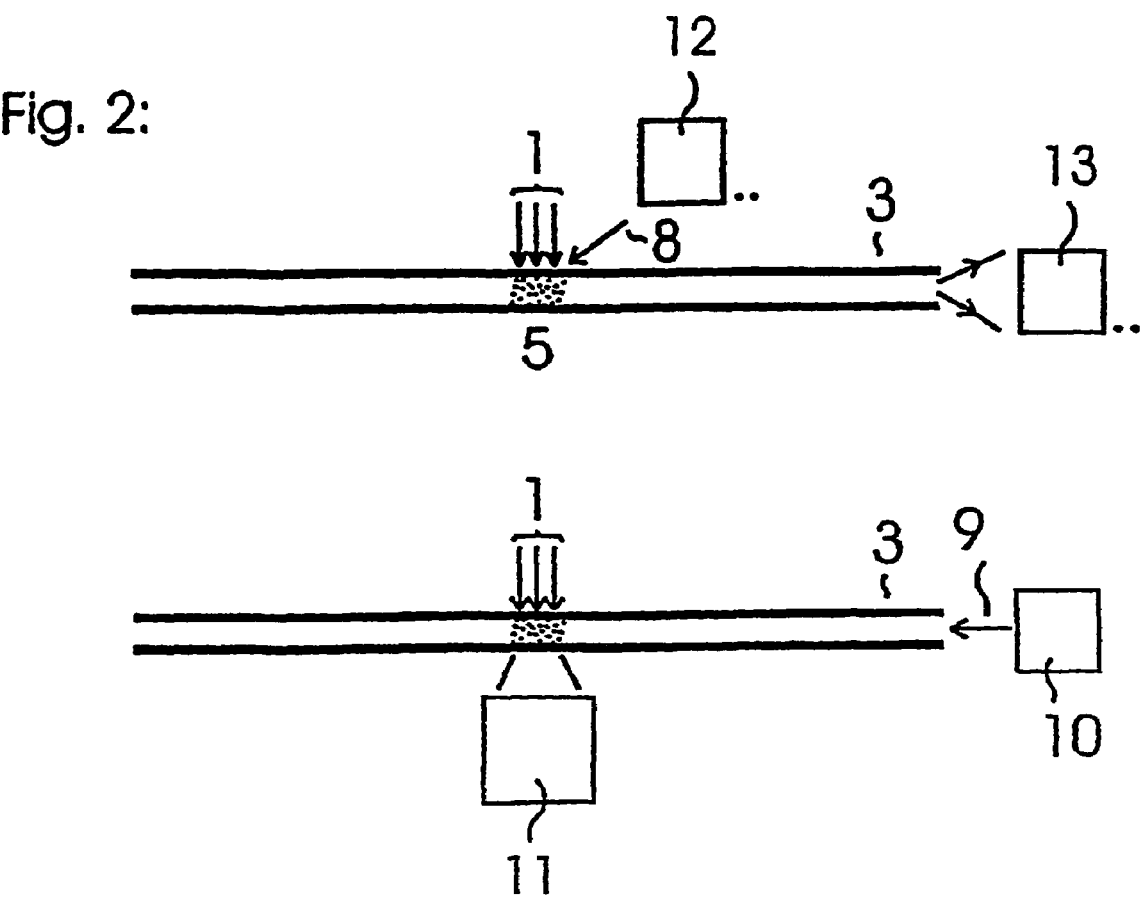
FIG. 2 shows the configuration of data transfer systems.

FIG. 2 illustrates the typical configuration of a data transfer systems.

The upper part of the illustration shows the coupling of light into the optical waveguide and at an optional position along the optical waveguide. Here, an emitter (12) emits light (8) in the direction of the extension of the optical waveguide. Additionally supplied energy (1) activates scattering centers at this site. One fraction of the light from the emitter is now scattered at these centers in such a way that it can be guided in the optical waveguide (3) up to the receiver (13) on one end of the optical waveguide.

The light transmission in the opposite direction operates in an analogous manner; one example of this effect is illustrated in the lower part of the illustration. An emitter (10) feeds light (9) at one end into the optical waveguide (3). This light is coupled out at scattering centers, which are stimulated by additional energy (1), and is then analyzed by the receiver (11).

Figure 3:
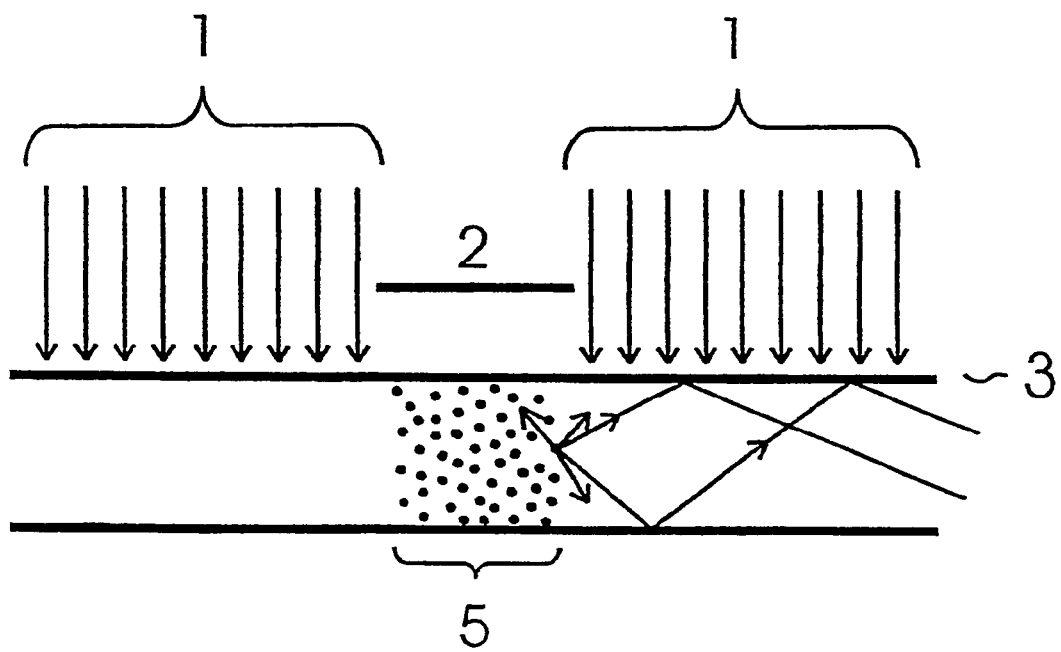
FIG. 3 is a view of a configuration in which the scattering centers are present without stimulation.

FIG. 3 shows an alternative configuration in which scattering centers are present without stimulation with additional energy.

Here, scattering centers are present in the region (5) cut off by the diaphragm (2) from the stimulating energy (1). The remaining part of the optical waveguide (3) is irradiated with the stimulating energy, which results in the effect that the scattering centers disappear and that the optical waveguide has the characteristics that are normal in an optical waveguide.

FIG. 4 is an exemplary illustration of different types of energy or signal coupling, respectively, in the case of signal feeding at an optional site of the optical waveguide. The mechanisms are, of course, applicable, by way of analogy, to signal decoupling at an optional site along the optical waveguide.

In the top illustration, the signal of high power (41) is coupled into the optical waveguide (3). The power of the signal is set here to such a high level that scattering centers are created at the site of light radiation into the optical waveguide, which centers, in their turn, couple one part of the signal into the optical waveguide in the direction of propagation in the optical waveguide. The middle illustration shows the preferred application in which the data signal (1) and the energy (8) for stimulating or controlling the scattering centers, respectively, are coupled from separate sources into the optical waveguide (3).

The bottom illustration shows the case where a form of energy other than light, for instance an ionizing radiation (42), is coupled into the optical waveguide for the creation of scattering centers. Here, modulated light (8) is coupled in the region of the scattering centers again for the transmission of information.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Device for transmitting optical signals or energy, comprising:
   at least one optical emitter;
   at least one optical receiver; and
   an optical waveguide configured as a hollow body filled with solid, liquid or gaseous material and operatively coupling the at least one optical emitter and the at least one optical receiver to each other; wherein
   a single energy source is provided for controlling scattering action and for signal transfer;

the optical waveguide has at least one site along the waveguide at which light is coupled into or decoupled from the waveguide and comprises optical scattering centers at the at least one site for coupling light into or out of the waveguide; and the site or nature of the scattering centers is controlled by outside simulation.

2. Device for optical transmission of data at high rates, comprising:

at least one emitter of optical data signals;

at least one receiver of optical data signals; and an optical waveguide configured as a hollow body filled with one of solid, liquid and gaseous material for transmitting signals between the at least one emitter and the at least one receiver; wherein optical signals from the emitter are coupled into the optical waveguide at one end thereof and laterally coupled out via an element for coupling out from one site along the optical waveguide for transmission to the optical receiver, or and laterally coupled into the optical waveguide via an element for coupling at one site along the optical waveguide and coupled out from one end thereof for transmission to the optical receiver;

the sites along the optical waveguide at which signals are laterally coupled into or out of the waveguide comprise optical scattering centers, influenced in non-contacting manner by outside stimulation with electromagnetic fields or waves, or particles; and the site of the scattering centers is varied with a movement of the element for coupling in or coupling out to permit continuous coupling in or coupling out during the movement.

3. Device according to claim 2, wherein scattering centers are permanently present in said optical waveguide at pre-determined position for coupling and decoupling light.

4. Device according to claim 2 wherein said optical waveguide includes material in which said scattering centers are operable by a variation of volume, structure, inter-molecular or intra-molecular force or at least one matter state.

5. Device according to claim 2, wherein said optical waveguide includes material having scatter influenceable by a photorefractive effect, a photo-addressable effect, thermal non-linearity effect or a rheologic effect.

6. Device according to claim 2, wherein said optical waveguide comprises glass, synthetic resin or suitable light-guiding materials and is a fiber or a planar waveguide element.

7. Device according to claim 2, wherein at least two different sources are provided for controlling scattering action and for signal transfer.

8. Device according to claim 2, wherein a single energy source is provided for controlling scattering action and for signal transfer.

* * * * *